(12) United States Patent
Fye et al.

(10) Patent No.: US 7,690,496 B1
(45) Date of Patent: Apr. 6, 2010

(54) HIGH SPEED SWITCH FOR A DIVERTER CONVEYOR, RELATED ARTICLE DIVERTER, AND RELATED METHODS

(75) Inventors: Stephen C. Fye, Glasgow, KY (US); Lewis W. Ward, Glasgow, KY (US); B. Keith Thomas, Cave City, KY (US); Ashok R. Anumula, Glasgow, KY (US)

(73) Assignee: Span Tech LLC, Glasgow, KY (US)

( * ) Notice: Subject to any disclaimer, the term of this patent is extended or adjusted under 35 U.S.C. 154(b) by 75 days.

(21) Appl. No.: 12/024,285

(22) Filed: Feb. 1, 2008

(51) Int. Cl.
*B65G 47/46* (2006.01)
(52) U.S. Cl. ............................. 198/370.02; 198/370.03
(58) Field of Classification Search ................................ 198/370.01–370.05
See application file for complete search history.

(56) References Cited

U.S. PATENT DOCUMENTS

| | | | |
|---|---|---|---|
| 2,784,851 A | 3/1957 | Bretschneider | |
| 3,157,270 A | 11/1964 | Prucha et al. | |
| 3,727,758 A | 4/1973 | Cleland | |
| 3,731,782 A | 5/1973 | Del Rosso | |
| 3,807,314 A | 4/1974 | Slemmons | |
| 4,618,052 A | 10/1986 | Rickett et al. | |
| 4,896,760 A * | 1/1990 | Triantafilou et al. | ... 198/370.02 |
| 5,409,095 A | 4/1995 | Hoshi et al. | |
| 5,613,591 A * | 3/1997 | Heit et al. | ............... 198/370.02 |
| 5,967,289 A | 10/1999 | Kelsey | |
| 6,615,972 B2 | 9/2003 | Veit et al. | |
| 6,923,308 B2 | 8/2005 | Veit et al. | |
| 6,951,274 B2 | 10/2005 | Zeitler et al. | |
| 7,055,669 B2 | 6/2006 | Veit | |
| 7,240,781 B2 | 7/2007 | Ramaker et al. | |
| 7,284,652 B2 | 10/2007 | Zeitler et al. | |

* cited by examiner

*Primary Examiner*—Mark A Deuble
(74) *Attorney, Agent, or Firm*—King & Schickli, PLLC

(57) ABSTRACT

A diverter is for intended use in connection with a diverter conveyor for diverting articles moving in a conveying direction from a first path of travel to a second path of travel. The diverter includes a guide mounted for relative movement thereto from a first position adjacent one side of the diverter corresponding to the first path of travel to a second position adjacent another side of the diverter corresponding to the second path of travel. A magnetic coupling is formed between the diverter and the guide for maintaining the guide in either the first position or the second position. A selector may be provided as part of a switch for switching the guide between the first and second positions. Related aspects include a conveyor incorporating the diverter and methods of use and manufacture.

27 Claims, 10 Drawing Sheets

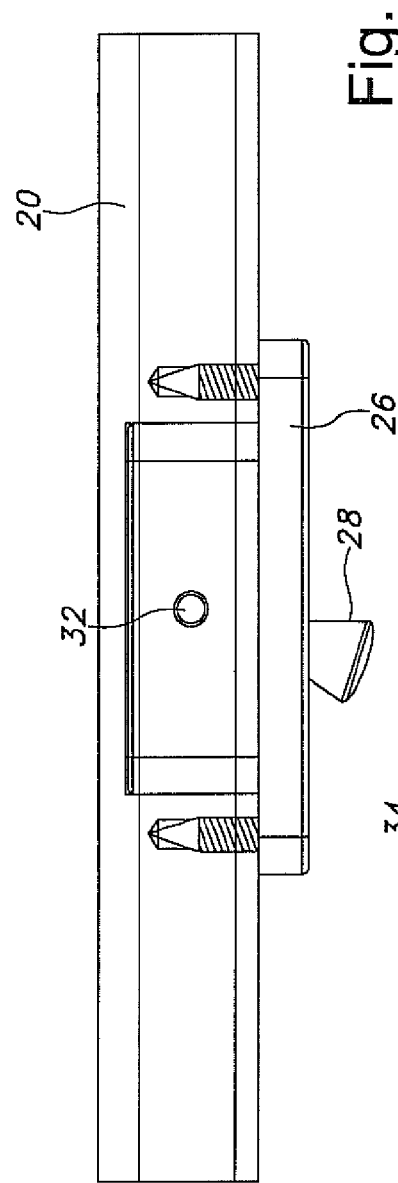
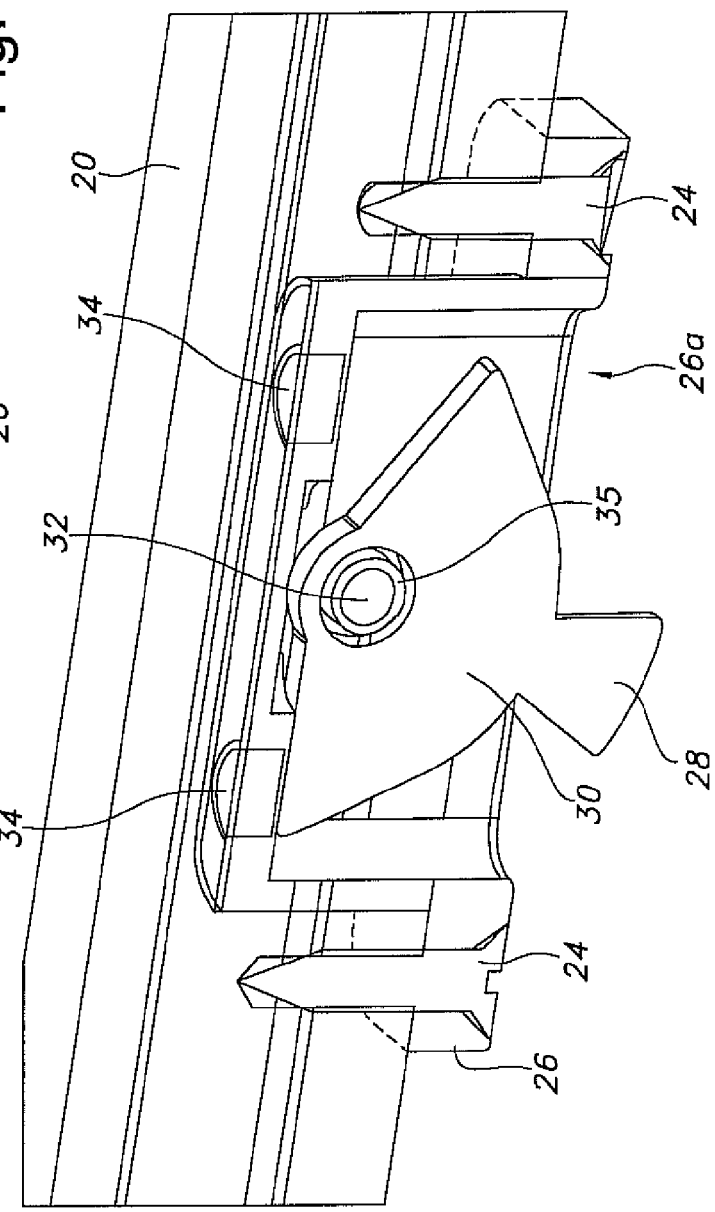
Fig. 6A
FIG. 6

HIGH SPEED SWITCH FOR A DIVERTER CONVEYOR, RELATED ARTICLE DIVERTER, AND RELATED METHODS

TECHNICAL FIELD

The present invention relates generally to conveyors and, more particularly, to a conveyor for diverting articles being conveyed.

BACKGROUND OF THE INVENTION

Systems for selectively diverting conveyed articles in a direction transverse to the conveying direction are well known. The typical arrangement includes a conveyor associated with a plurality of diverters (sometimes called "carriers") for engaging the articles. As the conveyor moves in an endless path, an adjacent guide track engages a guide associated with each diverter. In the usual mode of operation, this engagement causes the diverter and the associated article to move laterally along the conveyor. Using such an arrangement advantageously allows for selective placement of the articles into multiple rows or lanes, as necessary or desired for a downstream operation, or alternatively may simply divert selected articles to a takeaway conveyor for further processing.

During high speed operation, a fixed guide associated with each diverter is used to transition from a main portion to an auxiliary portion (branch or spur) of the guide track for effecting the desired diversion. Typically, the switching is done by either mechanically moving the guide track or else using a magnet at the intersection to cause the diverter to follow the alternate path associated with the diversion of the article. At high speeds, both manners of switching are considered unreliable, and also must occur at the location of the intersection between the main and auxiliary portions in order to be effective. In the event the diverter is not properly switched, not only is the article not diverted in the desired manner, but a catastrophic failure may also result, requiring downtime to make the necessary repair. This downtime not only increases the maintenance expense, but also the expense associated with a concomitant loss in production while completing the appropriate repair operation.

Accordingly, a need is identified for a high speed diverter system that addresses and overcomes the foregoing limitations.

SUMMARY OF THE INVENTION

An apparatus is for intended use in connection with a diverter conveyor for conveying articles in a conveying direction along a first path of travel or a second path of travel. The apparatus comprises a diverter for moving along in the conveying direction, the diverter including an article engaging surface and a guide mounted to the diverter for relative movement thereto from a first position adjacent one side of the diverter corresponding to the first path of travel to a second position adjacent another side of the diverter corresponding to the second path of travel. A magnetic coupling is formed between the diverter and the guide for maintaining the guide in either the first position or the second position.

Preferably, the guide is pivotally mounted to the diverter for movement between the first and second positions. The guide may comprise a ferromagnetic material and the diverter may further comprise first and second magnets corresponding to the first and second positions of the guide, or vice versa. The guide preferably also depends from the diverter in a direction generally opposite the article engaging surface.

Another aspect of the disclosure relates to an apparatus for conveying articles moving in a conveying direction along a first path of travel or a second path of travel. The apparatus comprises an endless conveyor and a diverter conveyed by the endless conveyor. The diverter includes an article engaging surface and a guide mounted to the diverter for relative movement thereto from a first position adjacent one side of the diverter corresponding to the first path of travel to a second position adjacent another side of the diverter corresponding to the second path of travel. A magnetic coupling is formed between the guide and the diverter for maintaining the guide in either the first position or the second position.

Preferably, the endless conveyor comprises a plurality of supports for supporting the diverter for movement in the transverse direction, as well as a pair of spaced endless chains for supporting the plurality of supports. A selector is also provided for moving the guide between the first and second positions, along with a first guide track corresponding to the first path of travel and an intersecting second guide track corresponding to the second path of travel.

Yet another aspect is an apparatus for conveying articles moving in a conveying direction along a first path of travel or a second path of travel. The apparatus comprises a diverter including an article engaging surface and a guide mounted to the diverter for relative movement thereto from a first position adjacent one side of the diverter corresponding to the first path of travel and a second position adjacent another side of the diverter corresponding to the second path of travel. A switch comprising a first guide track corresponding to the first path of travel, a second, intersecting guide track corresponding to the second path of travel, the first and second guide tracks arranged for engaging the guide of the diverter, and a selector for selecting the first or second position of the guide. The selector is positioned upstream of the intersection between the first and second guide tracks.

Preferably, a magnetic coupling is provided for holding the guide in either the first position or the second position. Furthermore, a structure defining the intersection of the first and second guide tracks includes an apex is preferably offset from a midpoint between the first and second positions of the guide. The selector may be positioned upstream of an outfeed guide positioned upstream of the intersection of the first and second guide tracks.

Still a further aspect of the disclosure is a method for conveying articles in a conveying direction along a first path of travel or a second path of travel. The method comprises conveying a diverter including a guide mounted for movement between a first position adjacent one side of the diverter corresponding to the first path of travel to a second position adjacent another side of the diverter corresponding to the second path of travel. The method further comprises holding the guide in either the first position or the second position by way of a magnetic coupling between the diverter and the guide. The method may still further comprise the step of moving the guide between the first and second positions.

Yet a further aspect of the disclosure is a method of manufacturing a diverter for conveying articles in a conveying direction along a first path of travel or a second path of travel. The method comprises mounting a guide to the diverter for movement relative to the diverter from a first position adjacent one side of the diverter corresponding to the first path of travel to a second position adjacent another side of the diverter corresponding to the second path of travel. The method further comprises forming a magnetic coupling between the diverter and the guide for maintaining the guide in the first or second position during conveyance.

BRIEF DESCRIPTION OF THE DRAWINGS

FIG. 6 is a partially cutaway, partially cross-sectional perspective view of an alternate embodiment of the diverter; and FIG. 6a is a cutaway end view of the diverter of FIG. 6.

DETAILED DESCRIPTION OF THE INVENTION

Figure 1:
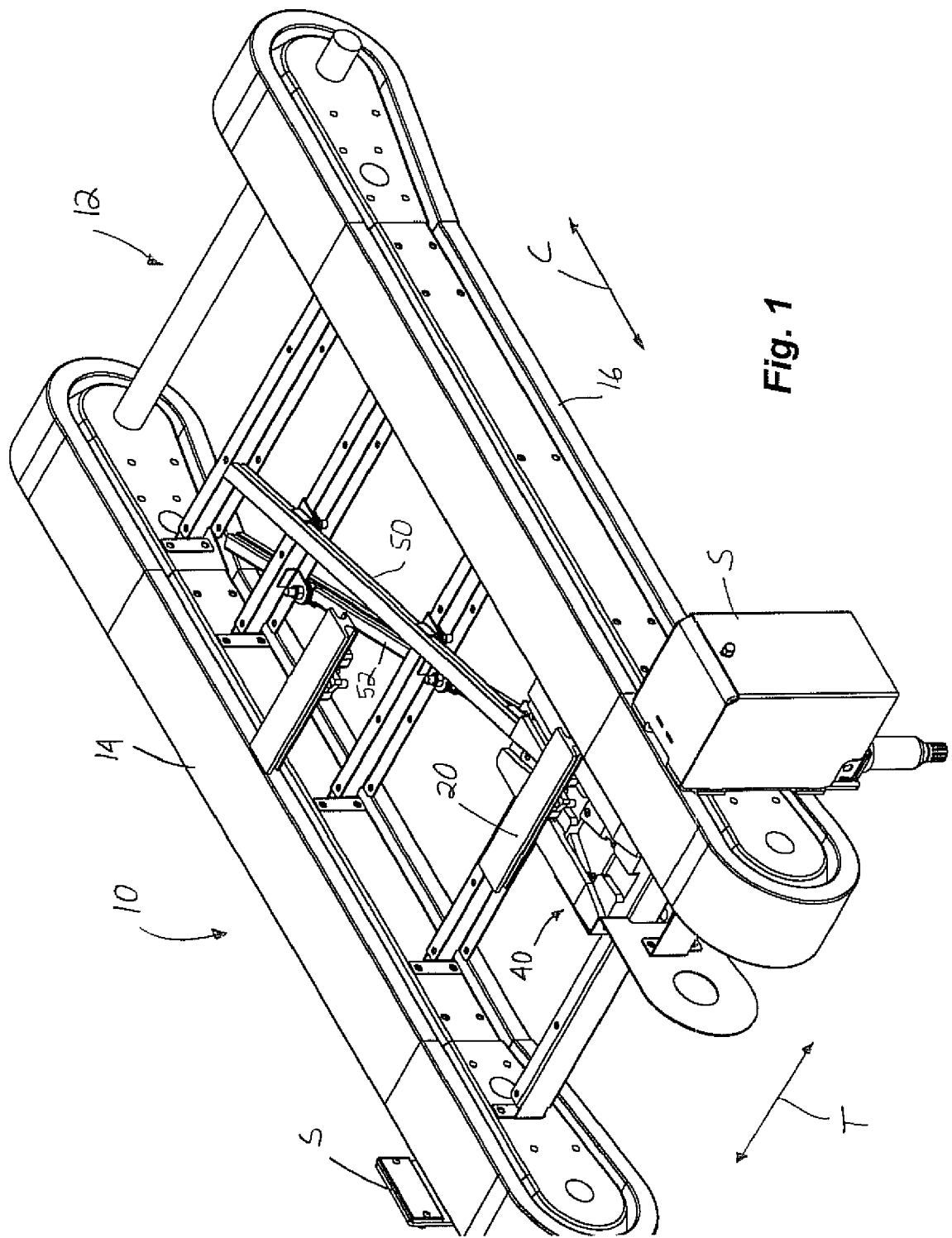
FIG. 1 is a perspective view of a conveyor for use in connection with the diverter forming one of the many inventions described herein.
Figure 1A:
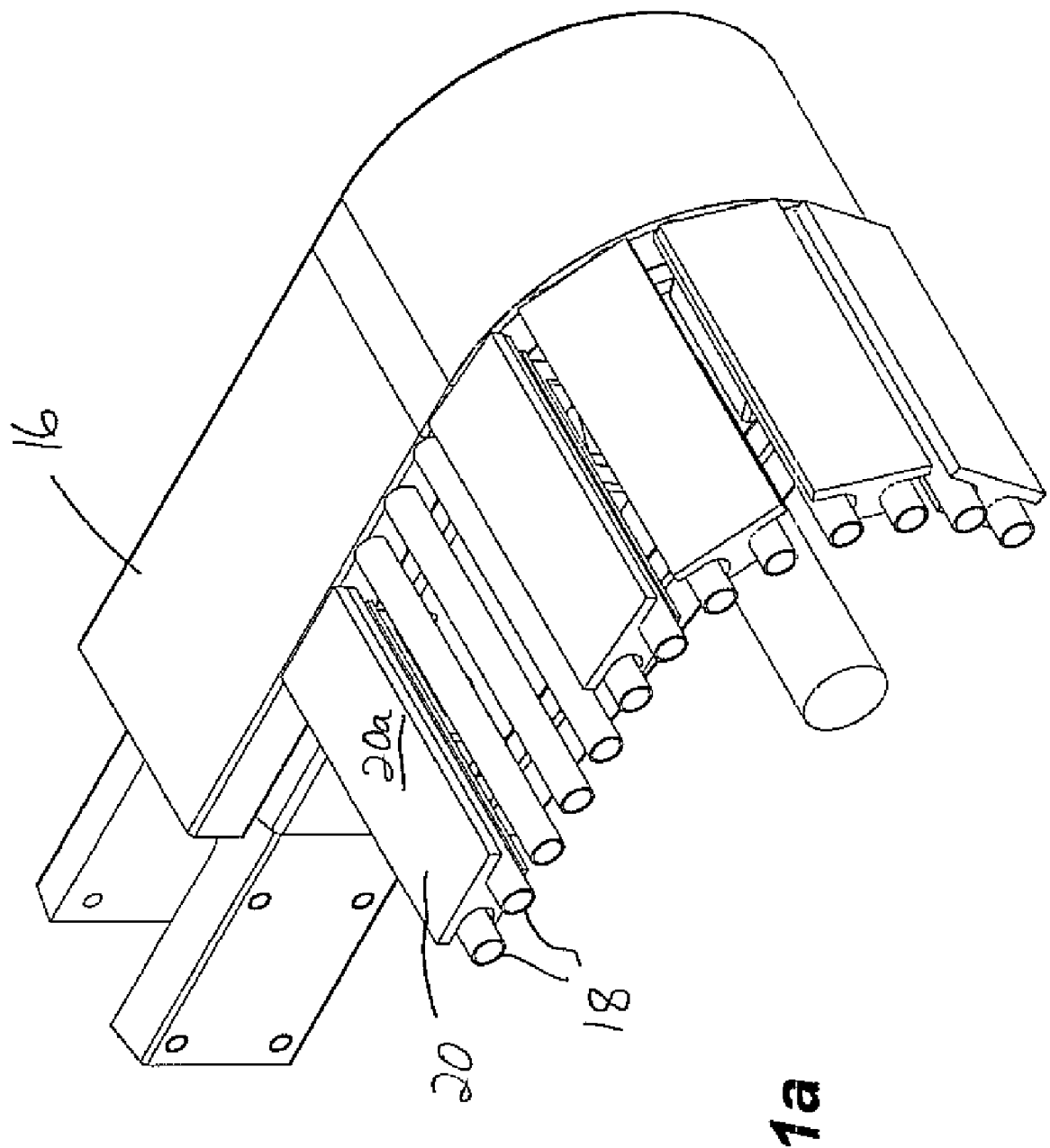
FIG. 1a is a partially cutaway, partially cross-sectional perspective view of one end of the conveyor of FIG. 1.
Figure 1B:
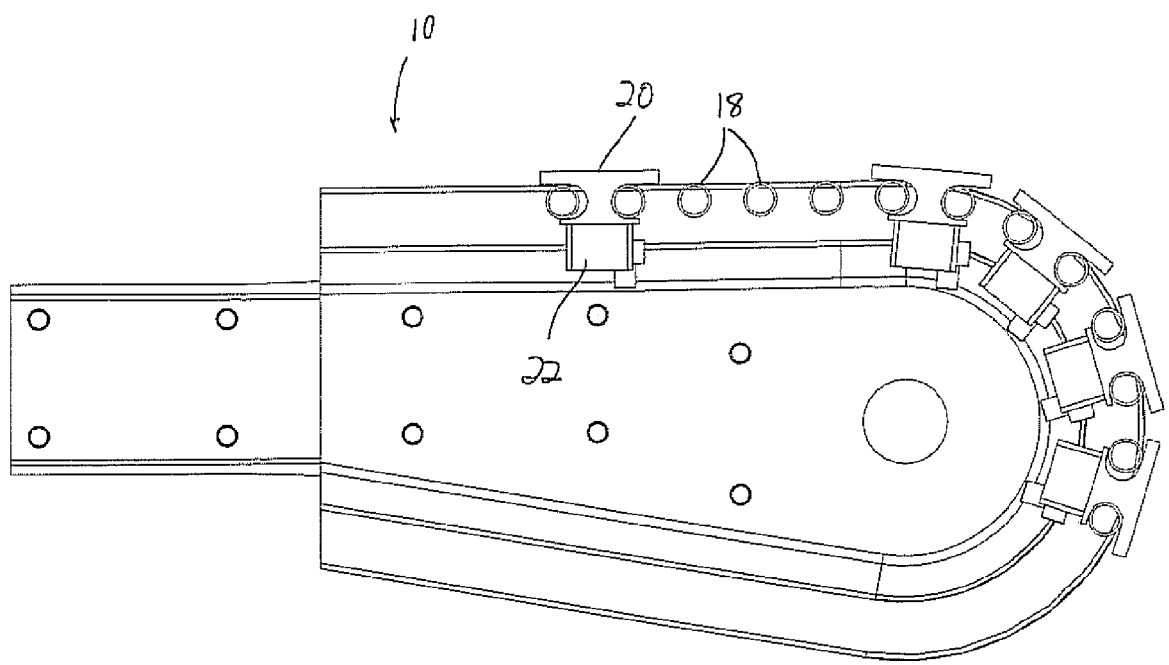
FIG. 1b is a partially cutaway, partially cross-sectional side view of one end of the conveyor of FIG. 1.

Reference is now made to FIGS. 1, 1a and 1b, which illustrate a diverter system 10 forming one aspect of the present invention. The system 10 as shown includes a driven conveyor 12 comprised of a first endless conveyor 14 (including a chain; not shown), a second endless conveyor 16 spaced from the first chain, one or more associated diverters 20 for supporting or engaging the article(s) being conveyed (preferably, on its upper or article engaging surface 20a), and diverter support (in the form of transverse rods 18; note cross-sectional depiction in FIG. 1a) positioned between the conveyors 14, 16. In the illustrated embodiment, the association with the support rods 118 is such that the diverter 20 is capable of slidably moving relative to the support in a transverse or lateral direction T relative to the conveying or longitudinal direction C along a forward run in response to the influence of an externally applied force in order to divert articles transversely across the conveying surface (such as for forming lanes on a downstream conveyor, or for moving selected articles onto an associated takeaway conveyor (not shown)). The details of an exemplary diverter conveyor may be found in Applicant's international patent application PCT/US05/003497, the disclosure of which is incorporated herein by reference.

Figure 2:
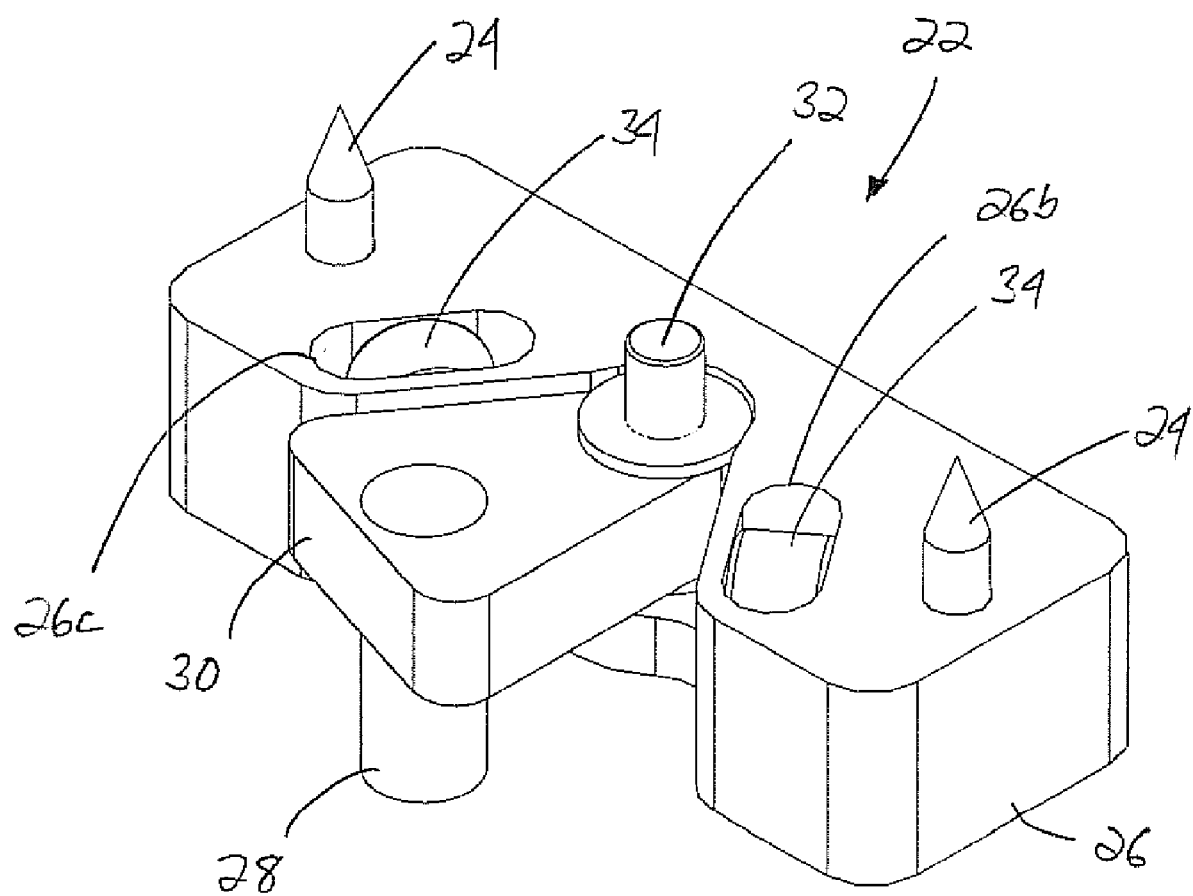
FIG. 2 is a perspective view of the guide for use with the diverter.
Figure 3:
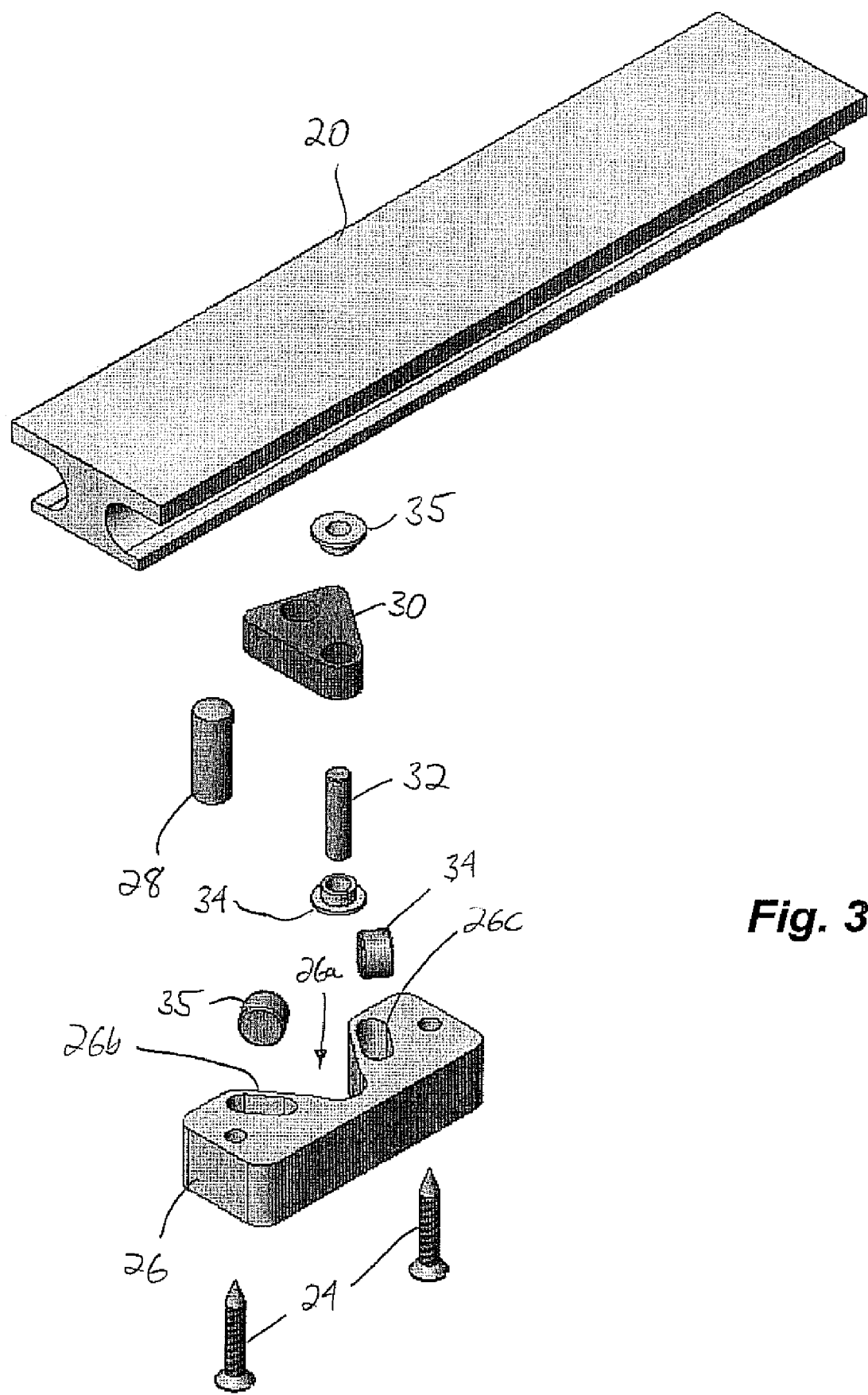
FIG. 3 is an exploded view of the diverter including the guide of FIG. 2.

Turning to FIG. 1b, as well as FIGS. 2-3, each diverter 20 includes a guide assembly 22 for use in causing it to move selectively in the transverse direction T depending on its association with a corresponding guide structure (as will be discussed in more detail below). This guide assembly 22 preferably mounts to the underside of the diverter 20, such as by using fasteners 24, and includes a body 26 supporting a movably mounted guide 28 in an associated recess or cavity 26a. Specifically, the guide 28 in the illustrated embodiment connects to a support 30, which in turn is mounted for pivoting movement from a first position adjacent one side of the body 26 to a second position adjacent another, preferably opposite side of the body. More specifically, the body 26 carries a pin 32 in a generally vertical orientation for receiving the support 30 such that it can pivot to or fro in a horizontal plane. Suitable means for capturing the support 30 in place on the pin 32 without inhibiting the movement of the associated guide 28 between the relative positions may also be included, such as one or more bushings 35.

In order to maintain the guide 28 in either the first or second position, and thus determine the path of travel in the conveying direction C, a magnetic coupling is provided. Preferably, this magnetic coupling is formed between the body 26 and the guide support 30. In the illustrated embodiment, this is accomplished by associating magnets 34 with the body 26, such as in recessed pockets 26b, 26c corresponding to the first and second positions. Preferably, the magnets 34 are disk-shaped, oriented with one pole facing the support 30, and formed of a strong permanent magnetic material, such as that comprising Neodymium. The support 30 may then be formed of a magnetic material for forming the desired magnetic coupling, and most preferably comprises a ferromagnetic material. Alternatively, it should be appreciated that the body 26 could be formed of a ferromagnetic material, while the support 30 carries one or more magnets for forming the coupling in order to maintain the guide 28 in the first or second position. In any case, the relative positioning is preferably such that the magnetic coupling holds the guide 28 in the first or second position. The coupling should be sufficiently strong that an intermediate position cannot be maintained, but not so strong that interference is created that would urge the guide to the opposite position as the sole result of magnetic attraction.

Figure 4:
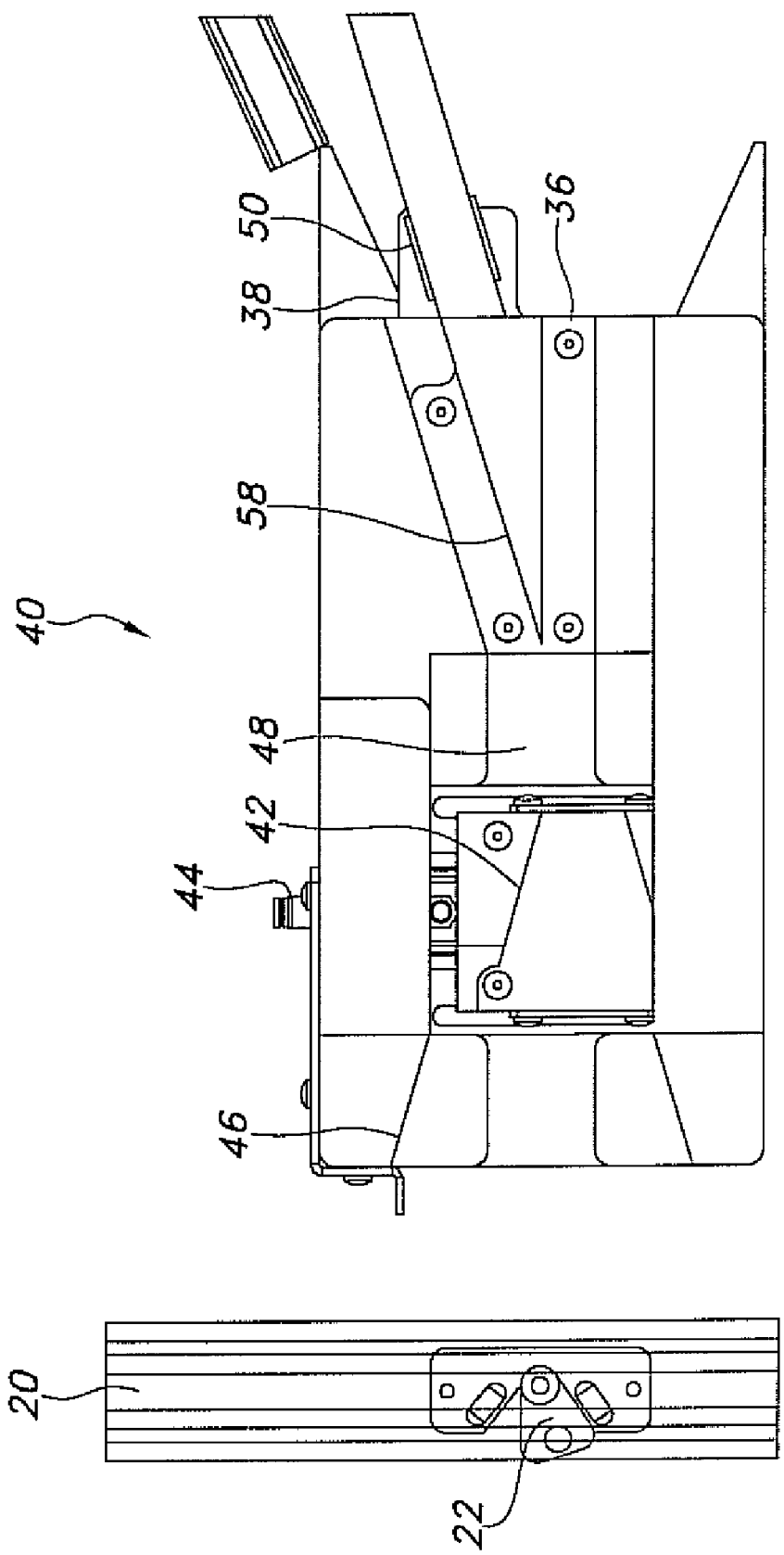
FIG. 4 is a top plan view of the diverter and an associated switch.
Figure 5A:
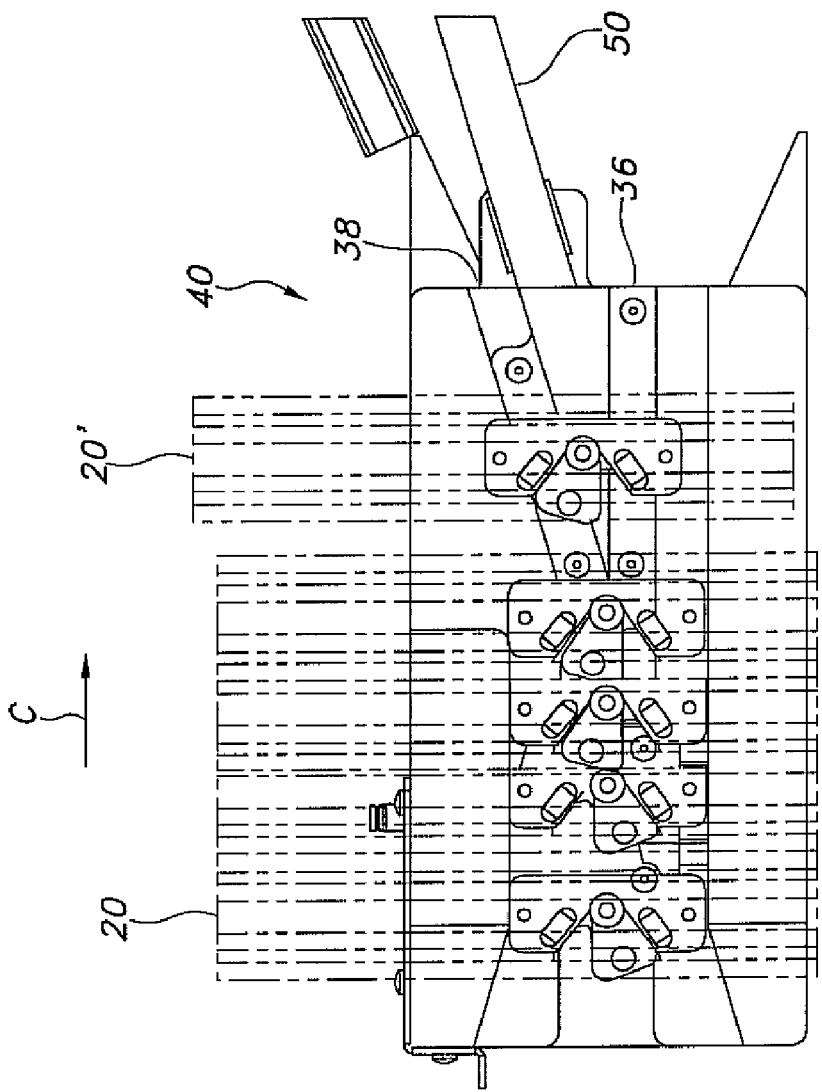
FIGS. 5a and 5b are top plan views illustrating various modes of operation of the diverter in association with the switch.
Figure 5B:
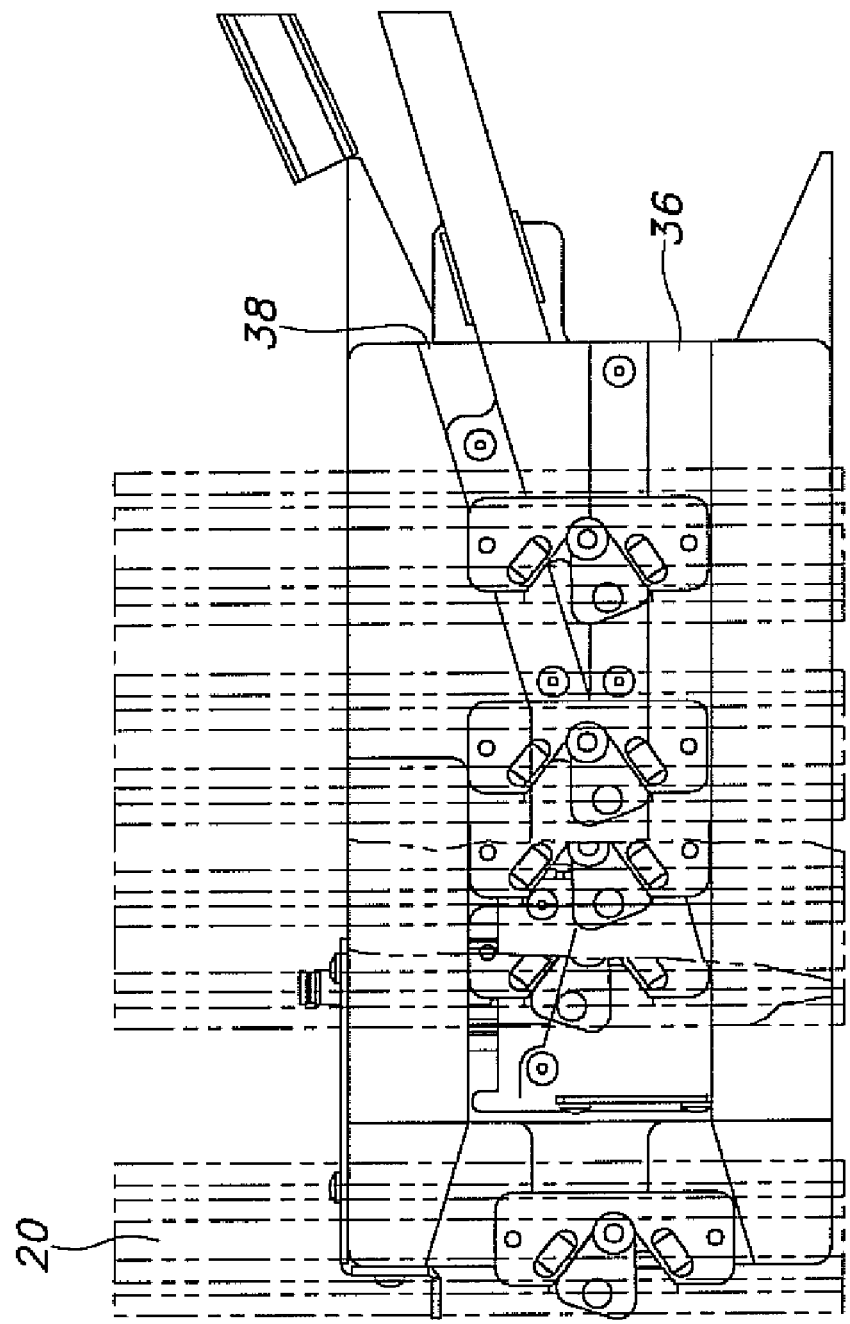

Turning now to FIGS. 4 and 5a-5b, one manner of using the diverter 20 of FIGS. 2-3 in connection with the conveyor 12 is shown and will be described. The conveyor 12 is associated with first and second guide tracks 36, 38 that correspond to the first and second positions of the guide 28. The guide tracks 36, 38 intersect at a point, upstream of which is mounted a switch 40 positioned generally below the diverter 20 for use in selectively positioning the guide 28. Most preferably, the switch 40 is positioned as close as possible to the point in the endless path where the diverter 20 arrives at the forward or upper run from the return or lower run of the conveyor 12.

Figure 4A:
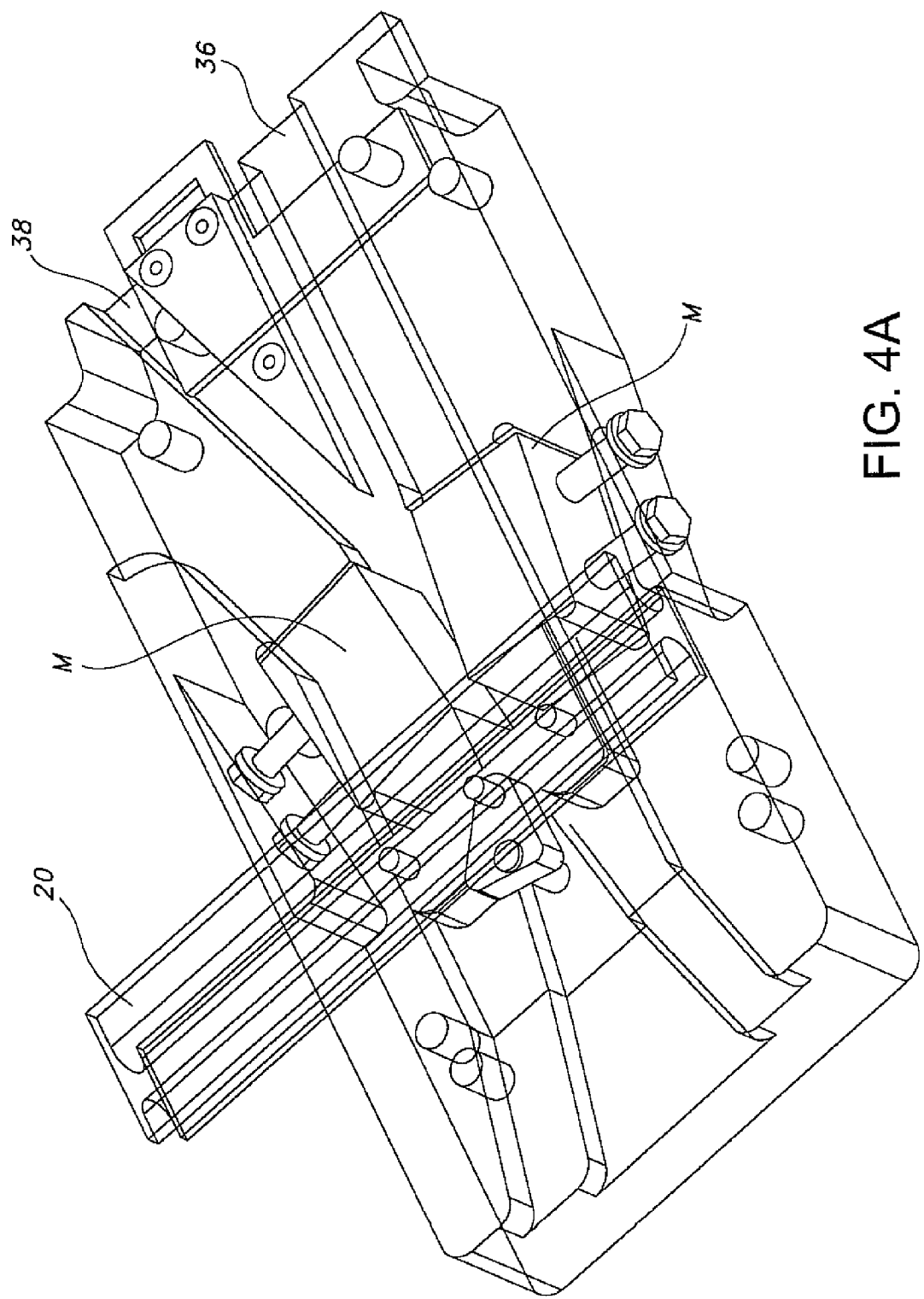
FIG. 4a is a perspective view of an alternate embodiment of the switch.

In the illustrated embodiment, the switch 40 comprises a selector, such as a pusher 42, associated with an actuator 44, such as a linear actuator for moving the pusher to and fro in the transverse direction. However, the selector could also take the form of means for applying an attractive or repulsive force for moving the guide 28 between the respective positions, such as may be supplied by one or more selectively actuated electromagnets M forming part of the switch 40 (see FIG. 4a). Infeed and outfeed guides 46, 48 may also be provided on opposite sides of the selector to ensure the guide 28 is guided in the proper manner as the transition is made into and out of the switch 40.

Referring now to FIG. 5a, operation of the system 10 including the conveyor 12 with the diverter 20 with the guide assembly 22 is shown. In this embodiment, the guide 28 is initially maintained in the first position corresponding to the first guide track 36 while the conveyors 14, 16 move the diverter 20 along in the conveying direction. If it is determined that the diverter 20 should divert an associated article (not shown) or otherwise move in a direction transverse to the conveying direction C, the switch 40 is actuated (such as based on an output signal from a sensor S mounted adjacent the conveying surface, such as a photoeye). As a result of actuation, the selector (pusher 42 in the illustrated embodiment) moves the guide 28 through an arc in a horizontal plane (as the result of the pivotal mounting of the associated support 30) and from the first position to the second position. The applied energy is such that the magnetic coupling holding the guide 28 in the first position is broken or overcome (such as by decoupling the support 30 from the associated magnet 34), and then reestablished as the result of the repositioning of the guide to the second position (such as by the support 30 coupling with the other magnet 34). Consequently, when the guide 28 reaches the intersection as the result of the continued movement of the diverter 20 in association with the endless conveyors 14, 16, it associates with the second guide track 38 and the diverter 20 is diverted as a result. The guide 28 thereafter remains mechanically captured in this guide track 38, and is thus prevented from returning to the first position or returning to the first guide track 36. A downstream guide member 50 ensures that the depending guide 28 follows the desired path to effect the movement of the diverter 20, and may thus be arranged at any selected angle and length, depending on the desired application.

FIG. 5b illustrates the situation where the guide 28 enters the switch 40 toggled to the second position corresponding to the second guide track 38. If diversion of the article is desired, then no action is of course necessary. However, if it is desired to toggle the guide 28 back to the first position associated with the first guide track 26, the selector may be used to accomplish this, either by actuation at or before the diverter 20 is in the proper position such that the selector (pusher 42 in the embodiment shown) engages and urges it to move. FIG. 5b shows the pusher 42 serving as the selector positioned to cause the guide 28 to move to the first position such that it is captured by and follows the corresponding guide track 36, including downstream of the switch 40.

As should be appreciated, the initial position of the diverter 20 shown in FIG. 5b corresponds to the path followed by the first guide track 36, even though the guide 28 approaches in the second position. This initial positioning may be result from a corresponding return guide member 52 or like structure along a return run of the conveyor 12 (see FIG. 1). This position of the diverter 20 may also be achieved without changing the position of the guide 28, as indicated in FIG. 5b.

Numerous advantages flow from practicing the foregoing teachings. Aside from the simplicity, an advantage of the proposed approach is that it avoids the need for mechanical gates, fixed magnets, or the like positioned precisely at the intersection between the guide tracks. Rather, the decision to divert is made upstream of the intersection, which helps to ensure that it is done in the proper manner and potentially avoids catastrophic failures that may be caused by a mechanical failure. This is further aided by the use of the outfeed guide 48 of the switch 40, which helps to ensure that the guide 28 has time to reach the desired position and form the magnetic coupling if switched ahead of the intersection. Throughput may thus be increased without sacrificing reliability or adding considerable cost and complexity.

FIG. 4 shows a divider 58 at the intersection between the diverging guide tracks 36, 38 as having an apex substantially aligned the midpoint or center of the path of travel of the guide 28 relative to the diverter assembly 22 in the transverse direction. If the guide 28 were to somehow inadvertently assume a position intermediate the first and second positions, a collision might occur with the apex of this divider 58, which of course is undesirable. Hence, it is also contemplated that the apex should be offset from this centered position, thereby helping to assure that a collision is avoided and the guide 28 is urged into the corresponding guide track 36, 38.

FIGS. 6 and 6a illustrate an alternate embodiment of the guide assembly 22 associated with a diverter 20. As with the embodiment described above, the guide assembly 22 is mounted to underside of the diverter 20, such as by using fasteners 24, and includes a body 26 supporting a movably mounted guide 28. The guide 28 is again connected to a support 30 that is pivotally attached for movement from a first position adjacent one side of the body 26 to a second position adjacent another, preferably opposite side of the body, and may include one or more bushings 35. However, the body 26 carries a pin 32 in a generally horizontal orientation for receiving the support 30. Preferably, this support 30 is fabricated at least partly of a ferromagnetic material, and the magnets 34 are positioned above it on either side of the body 26 (but again it should be appreciated that the body could be formed of a ferromagnetic material, while the support carries any magnets for forming the coupling in order to maintain the guide in the first or second position). As a consequence of this alternate approach, a lower profile arrangement is provided, with the guide 28 forming a pendulum for swinging to and fro through an arc in a vertical plane at it moves between the relative positions.

With the exceptions described above for forming the magnetic coupling, the diverter 20 and its associated components may be formed of any durable material, with UHMW polyethylene, polypropylene or Acetal being preferred choices because of the high durability, relatively low weight, and low cost of such materials. Using these materials results in a substantially strong structure for contacting the articles, and one not prone to oxidation and rust. However, the diverter 20 and other components may be formed of any material, including metal or other polymers, without limitation.

The foregoing descriptions of various embodiments of the invention are provided for purposes of illustration, and are not intended to be exhaustive or limiting. Modifications or variations are also possible in light of the above teachings. For instance, it is possible to mount the guide 28 for relative sliding movement between the first and second positions. It is also possible to include additional switches and branches associated with more than the two guide tracks shown. More than one guide assembly 22 could also be associated with each diverter 20 for encountering associated switches spaced apart in the transverse direction T, the conveying direction C, or both. The embodiments described above were chosen to provide the best application to thereby enable one of ordinary skill in the alt to utilize the disclosed inventions in various embodiments and with various modifications as are suited to the particular use contemplated. All such modifications and variations are within the scope of the invention.

The invention claimed is:

1. An apparatus for intended use in connection with a diverter conveyor for conveying articles in a conveying direction along a first path of travel or a second path of travel, comprising:
   a diverter for moving along in the conveying direction, the diverter including an article engaging surface and a guide mounted to the diverter for relative movement thereto from a first position adjacent one side of the diverter corresponding to the first path of travel to a second position adjacent another side of the diverter corresponding to the second path of travel; and
   a magnetic coupling formed between the diverter and the guide for maintaining the guide in either the first position or the second position.

2. The apparatus of claim 1, wherein the guide is pivotally mounted to the diverter for movement between the first and second positions.

3. The apparatus of claim 2, wherein the guide moves in substantially the same horizontal plane.

4. The apparatus of claim 1, wherein the guide comprises a ferromagnetic material and the diverter further comprises first and second magnets corresponding to the first and second positions of the guide.

5. The apparatus of claim 1, wherein the guide depends from the diverter in a direction generally opposite the article engaging surface.

6. An apparatus for conveying articles moving in a conveying direction along a first path of travel or a second path of travel, comprising:
   an endless conveyor;
   a diverter conveyed by the endless conveyor, the diverter including an article engaging surface and a guide mounted to the diverter for relative movement thereto from a first position adjacent one side of the diverter corresponding to the first path of travel to a second position adjacent another side of the diverter corresponding to the second path of travel;
   a magnetic coupling formed between the guide and the diverter for maintaining the guide in either the first position or the second position.

7. The apparatus of claim 6, wherein the endless conveyor comprises a plurality of supports for supporting the diverter for movement in the transverse direction.

8. The apparatus of claim 7, wherein the endless conveyor comprises a pair of spaced endless chains for supporting the plurality of supports.

9. The apparatus according to claim 6, further including a first guide track corresponding to the first path of travel and an intersecting second guide track corresponding to the second path of travel.

10. The apparatus according to claim 6, further including a selector for selecting between the first and second positions of the guide.

11. The apparatus according to claim 10, wherein the selector comprises a pusher.

12. The apparatus according to claim 10, wherein the selector comprises an electromagnet.

13. The apparatus according to claim 6, wherein the guide comprises a ferromagnetic material and the diverter further comprises first and second magnets corresponding to the first and second positions of the guide.

14. An apparatus for conveying articles moving in a conveying direction along a first path of travel or a second path of travel, comprising:
   a diverter including an article engaging surface and a guide mounted to the diverter for relative movement thereto from a first position adjacent one side of the diverter corresponding to the first path of travel and a second position adjacent another side of the diverter corresponding to the second path of travel;
   a switch comprising a first guide track corresponding to the first path of travel, a second, intersecting guide track corresponding to the second path of travel, the first and second guide tracks arranged for engaging the guide of the diverter, and a selector for selecting the first or second position of the guide, the selector positioned in the path of travel of the guide and upstream of the intersection between the first and second guide tracks, and a magnetic coupling for holding the guide.

15. The apparatus according to claim 14, further wherein the magnetic coupling is for holding the guide in either the first position or the second position.

16. The apparatus according to claim 14, wherein a structure defining the intersection of the first and second guide tracks includes an apex that is offset from a midpoint between the first and second positions of the guide.

17. The apparatus according to claim 14, wherein the selector is positioned upstream of an outfeed guide positioned upstream of the intersection of the first and second guide tracks.

18. The apparatus according to claim 14, wherein the guide comprises a ferromagnetic material and the diverter further comprises first and second magnets corresponding to the first and second positions of the guide.

19. The apparatus according to claim 14, wherein the selector comprises an electromagnet.

20. The apparatus of claim 14, wherein the selector is positioned underneath the guide.

21. The apparatus of claim 14, wherein the selector comprises a pusher.

22. The apparatus of claim 14, wherein the selector is spaced apart from the intersection between the first and second guide tracks.

23. A method of manufacturing a diverter for conveying articles in a conveying direction along a first path of travel or a second path of travel, comprising:
   mounting a guide to the diverter for movement relative to the diverter from a first position adjacent one side of the diverter corresponding to the first path of travel to a second position adjacent another side of the diverter corresponding to the second path of travel; and
   forming a magnetic coupling between the diverter and the guide for maintaining the guide in the first or second position during conveyance.

24. The method of claim 23, wherein the forming step comprises mounting a pair of spaced magnets to the diverter corresponding to the first and second positions and fabricating the guide at least partially of a ferromagnetic material.

25. A method for conveying articles in a conveying direction along a first path of travel or a second path of travel, comprising:
   conveying a diverter including a guide mounted for movement between a first position adjacent one side of the diverter corresponding to the first path of travel to a second position adjacent another side of the diverter corresponding to the second path of travel; and
   holding the guide in either the first position or the second position by way of a magnetic coupling between the diverter and the guide.

26. The method of claim 25, further comprising the step of moving the guide between the first and second positions.

27. The method of claim 25, further including the step of forming the magnetic coupling by providing the diverter with a pair of spaced magnets corresponding to the first and second positions and forming the guide at least partially of a ferromagnetic material.

* * * * *